March 31, 1936.                H. J. WOOCK                 2,035,778
          METHOD AND MACHINE FOR APPLYING SHEET RUBBER TO LINERS
                     Filed March 20, 1933         3 Sheets-Sheet 1
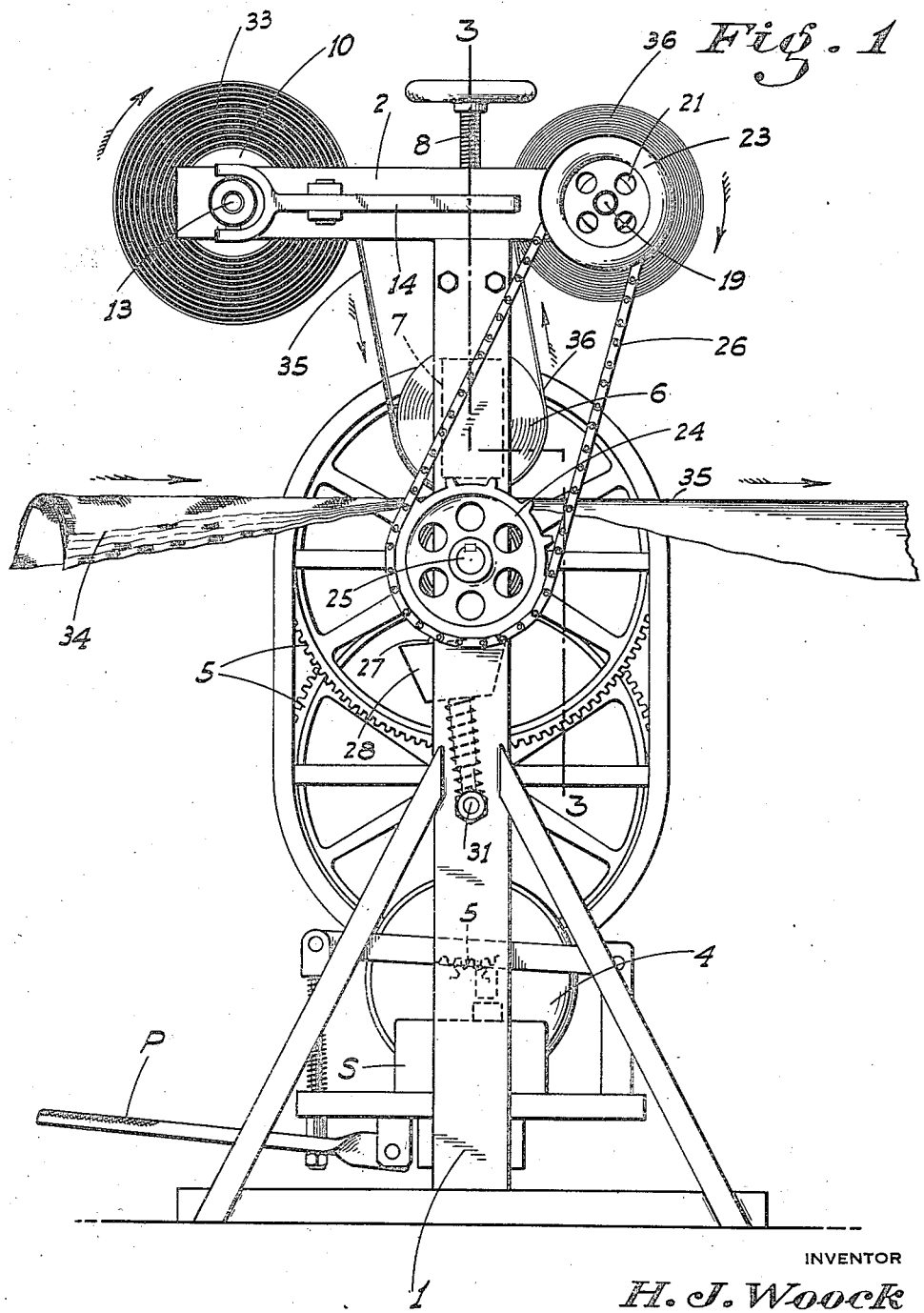
INVENTOR
H. J. Woock
BY
ATTORNEY

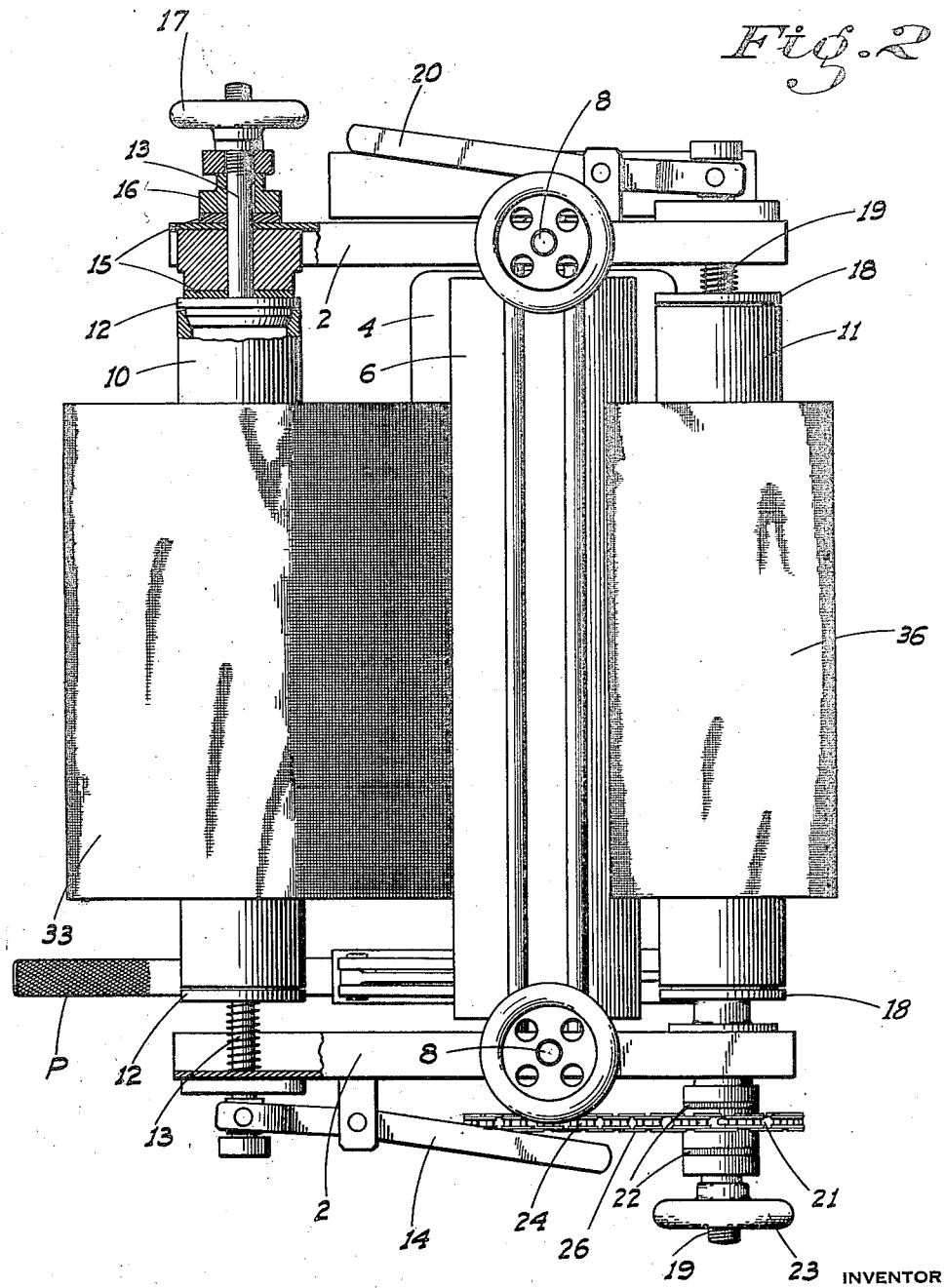

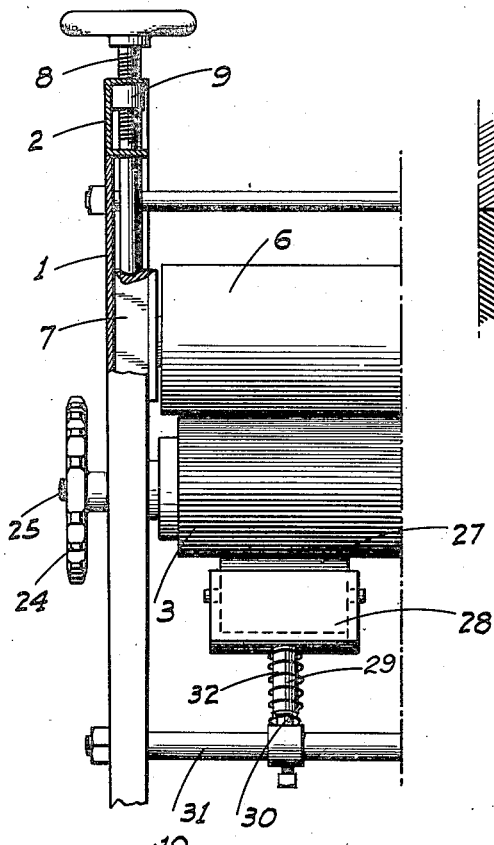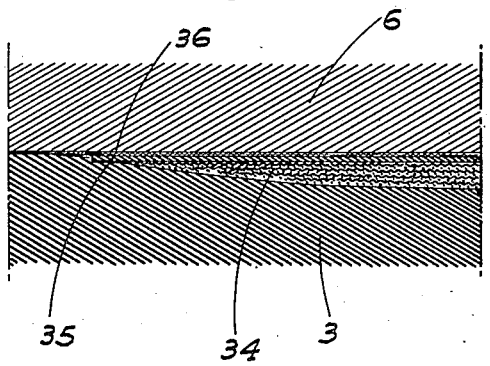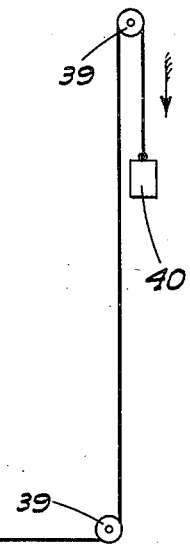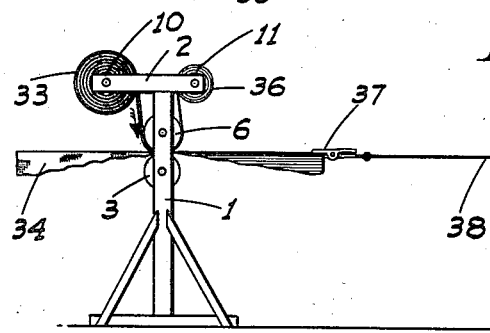

Patented Mar. 31, 1936

2,035,778

UNITED STATES PATENT OFFICE 2,035,778

METHOD AND MACHINE FOR APPLYING SHEET RUBBER TO LINERS

Herbert J. Woock, Lodi, Calif., assignor to Super Mold Corporation, Lodi, Calif., a corporation of Nevada Application March 20, 1933, Serial No. 661,686

2 Claims. (Cl. 154—2)

This invention relates to the tire industry and particularly to a machine for applying a thin layer of sheet rubber to liners adapted to be inserted in tire carcasses to reinforce the same, so that the liners may be vulcanized to the carcasses by means of the intermediate layer of rubber.

The liners are initially prepared from old tires in any suitable manner, being relatively thick in the middle and tapering to a thin feather edge at the sides. The opposite surfaces of the liner are not therefore parallel to each other. Besides this the liner retains to a certain extent the original transverse and circumferential curvature of the tire from which it is taken. As a result it is hard to get the liner to lie flat without buckling or wrinkling at some point and this makes it hard to apply a sheet of rubber thereto, since there is a tendency for air pockets to be formed between the rubber and liner which interfere with proper adhesion and vulcanizing.

The principal object of my invention is to provide a machine to overcome this problem, by means of which the liner will be positively flattened out on the side to which the rubber is to be applied during its movement through the machine and the rubber, also in a flat condition, is simultaneously applied to said surface. As a result a good adhesion between the rubber and the liner is assured which is aided by the fact that the two members are initially held together with any desired degree of pressure.

The rubber is initially in the form of a roll backed with holland, this being a convenient way of preparing and keeping the rubber and which is preferably done by means of the machine shown in my co-pending application for patent, Serial No. 661,685, filed March 20, 1933.

Another object of this invention is to provide a machine for the purpose so constructed that as the rubber is removed from the holland with the operation of the machine and transferred to the liner, the holland is automatically rolled up on a removable spool so that it may be used over again, to serve as a further backing for a new supply of rubber when transferred to said other machine. Not only is the rubber efficiently applied to the liner therefore but the ultimate costs of the material as a whole are reduced since the relatively expensive holland is used over and over again.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved machine as in use.

Fig. 2 is a top plan view of the same.

Fig. 3 is a fragmentary transverse view substantially on the line 3—3 of Fig. 1.

Fig. 4 is an enlarged fragmentary longitudinal section of the rolls of the machine showing a liner and holland backed rubber passing therebetween.

Fig. 5 is a diagram of the apparatus showing a method of pulling the liner through the machine.

Referring now more particularly to the characters of reference on the drawings, the machine comprises a pair of spaced standards 1 having horizontal members 2 at their upper ends, these elements being rigidly connected together and forming the frame of the machine.

Mounted between the standards intermediate their ends is a roll 3 of relatively soft rubber, which is driven at a suitable speed from an electric motor 4 by means of reduction gearing 5. This motor is mounted in connection with the standards and preferably between the same. The operation of the motor is controlled by a pedal P which controls the closing of a suitable switch disposed in a switch box S supported between the standards.

Another roll 6 of steel or other hard and non-yielding material is mounted directly above the roll 3, being journaled in end blocks 7 which are slidably guided between the standards. Vertical hand screws 8, threaded through lugs secured in the members 2, engage the tops of the blocks and enable the latter to be forced down against the roll 3 with any desired pressure.

Mounted between the members 2 are supply and take-up spools 10 and 11 respectively. The supply spool is releasably engaged by end heads 12 whose spindles 13 are journaled in the respective members 2. One spindle is connected to a throwout lever 14 so that said spindle may be moved axially and the adjacent head withdrawn from the spool to permit removal of the latter. The other spindle has friction washers 15 between the head and the spindle bearing and between said bearing and an axially adjustable collar 16 on the spindle. A hand wheel 17 threaded on the spindle enables any desired adjustment of the collar to be effected, to accordingly vary the degree of frictional contact of the washers with the adjacent parts.

The other spool 11, which is interchangeable with the spool 10, is also removably supported between end heads 18. The spindle 19 of one head has a throwout lever 20 the same as the lever 14 and for the same purpose. The spindle 19 of the other head has a sprocket wheel 21 turnable thereon which is engaged in driving relation with the spindle by an adjustable friction clutch device 22, the adjustment of which is controlled by a hand wheel 23. A sprocket wheel 24 is secured on one end of the shaft 25 of the roll 3 and is connected with the sprocket wheel 21 by a chain 26; the relative size of the sprockets being such that the spool 11 will rotate faster than the roll 3.

Transversely spaced rollers 27 are mounted in troughs 28 which contain a suitable non-sticking powder, said rollers engaging the under surface of the roll 3 toward its ends. The troughs are supported by sleeves 29 depending therefrom and slidably engaging rods 30 projecting upwardly from and adjustable along a cross bar 31 extending between the standards. Compression springs 32 about the sleeves and rods yieldably hold the rollers engaged with the roll 3.

In operation the spool 10 with a roll 33 of holland backed rubber thereon is placed in its proper position in the machine the holland from the outer turns of the roll (which preferably have no rubber thereon) being passed under the roll 6 before the latter is pressed down and being engaged with the take-up spool 11. The direction of unwinding of the roll is such that the rubber from said roll will be underneath or so as to contact with the roll 3. The roll 6 is then forced down snugly against the rubber roll 3 by the screws 8. The motor is then started and one end of the liner 34, with its surface to which the rubber is to be applied uppermost, is fed between the rolls 3 and 6.

Since the rolls cannot separate and only the roll 3 has a yieldable surface, the liner is flattened out so that its upper surface is maintained flatly against the upper roll 6, while its under and relatively curved surface (due to the irregularity of its thickness as previously explained) is taken care of by the yielding rubber roll and the liner is consequently embedded therein for its full area below said upper surface, as shown in Fig. 4.

At the same time the rubber 35 from the roll 33, which is also passed between the rolls together with its supporting holland, leaves the latter and adhere to the liner, which is first coated with cement if necessary. The bare holland 36 after the rubber has been removed from the same is wound by itself onto the spool 11 with the rotation of the roll 3, due to the driving connection between said spool and roll. The slip featuring the driving connection previously described causes the spool to rotate at a speed automatically controlled according to the size of the holland roll as it winds on the spool and increases in diameter.

In order to support the rubber covered liner as it emerges from the machine I preferably engage the forward end of the liner with a spring clip 37. This clip is connected to a cable 38 passing over suitable direction changing pulleys 39 and having a counterweight 40 on its opposite end. This counterweight therefore exerts a constant horizontal pull on the clip so that the liner is pulled straight out of the machine.

When the entire roll of holland covered rubber has been used up, one roll being sufficient for several liners, and the bare holland has been rolled onto the take-up spool the liner is removed from the machine and placed in the other machine to again serve as a backing for a new supply of rubber. The spool 10 is transferred to the position previously occupied by the spool 11 while a spool with a fresh roll of material from said other machine is placed on this machine ready for further operations. It is probable that the width of the rubber on the roll of material will be wider than that of the liner, so that as the rubber is stripped from the holland it will overlap the side edges of the liner and come in direct cotact with the roll 3. The rollers 27 keep the adjacent portion of the roll 3 covered with the non-sticking powder and prevent the adhesion of this overhanging rubber to the roll.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A machine for applying sheet rubber to a liner comprising coacting rolls between which the liner and rubber are fed in superimposed relation, longitudinally spaced and relatively short rollers engaging the roll with which the liner is in contact at zones beyond the side edges of the liner, troughs to contain a non-sticking substance in which the rollers are mounted, and means to adjust the troughs lengthwise of the roll.

2. The method of applying a flat strip of flexible rubber to a convexly curved liner, comprising the steps of moving the convexly curved liner and the strip of rubber lengthwise in the same direction, and in converging relation, temporarily flattening out the convexly curved liner, simultaneously bringing the rubber strip into an even adhering contact with the liner, and then advancing the liner to a point where the same may again assume its convex curvature.

HERBERT J. WOOCK.